US007796477B2

(12) United States Patent
Sato

(10) Patent No.: US 7,796,477 B2
(45) Date of Patent: Sep. 14, 2010

(54) OPTICAL PICK-UP DEVICE HAVING OBJECT LENSES FOR CORRECTING COMATIC ABERRATION

(75) Inventor: Katsutoshi Sato, Tokyo (JP)

(73) Assignee: Sony Corporation, Tokyo (JP)

(*) Notice: Subject to any disclaimer, the term of this patent is extended or adjusted under 35 U.S.C. 154(b) by 325 days.

(21) Appl. No.: 10/589,267

(22) PCT Filed: Dec. 9, 2005

(86) PCT No.: PCT/JP2005/022664

§ 371 (c)(1), (2), (4) Date: Aug. 14, 2006

(87) PCT Pub. No.: WO2006/064735

PCT Pub. Date: Jun. 22, 2006

(65) Prior Publication Data

US 2007/0165500 A1 Jul. 19, 2007

(30) Foreign Application Priority Data

Dec. 16, 2004 (JP) ............................ 2004-363851

(51) Int. Cl.
*G11B 7/00* (2006.01)

(52) U.S. Cl. ................................ 369/44.32; 369/44.14

(58) Field of Classification Search ............... 369/13.28
See application file for complete search history.

(56) References Cited

U.S. PATENT DOCUMENTS 5,930,214 A * 7/1999 Kasahara et al. ........... 369/53.2
6,141,304 A * 10/2000 Ogasawara .............. 369/53.19
6,449,106 B1 * 9/2002 Spinali ....................... 359/811
7,301,864 B2 * 11/2007 Horinouchi et al. ...... 369/44.37
2004/0114495 A1 * 6/2004 Kim et al. ............. 369/112.24
2004/0240084 A1 * 12/2004 Ito et al. ..................... 359/811
2005/0174504 A1 * 8/2005 Hashimoto ................... 349/54
2005/0174918 A1 * 8/2005 Ogata .................... 369/112.02
2006/0077784 A1 * 4/2006 Kanaya et al. ........... 369/44.14

FOREIGN PATENT DOCUMENTS

JP 2004 134056 4/2004
JP 2004 295983 10/2004
JP 2005293707 A * 10/2005

* cited by examiner

*Primary Examiner*—Hoa T Nguyen
*Assistant Examiner*—Mark L Fischer
(74) *Attorney, Agent, or Firm*—Oblon, Spivak, McClelland, Maier & Neustadt, L.L.P.

(57) ABSTRACT

An optical pick-up device in which two object lenses correct comatic aberration with respect to object lenses. First and second optical systems converge either one of light beams having first, second and third wavelengths onto an optical disc. Object lenses are displaced in three axial focusing directions including a direction perpendicular to the recording surface of the optical disc, a tracking direction radial to the optical disc, and either one of a radial tilt direction in a circular arc form on the axis of the radial direction and a tangential tilt direction in a circular arc form on the axis in a tangential direction perpendicular to the radial direction. Comatic aberration of the second optical system is corrected relative to the first optical system in the other direction of the radial tilt direction and the tangential tilt direction, which is not controlled by the object lens drive unit, is corrected.

2 Claims, 10 Drawing Sheets

OPTICAL PICK-UP DEVICE HAVING OBJECT LENSES FOR CORRECTING COMATIC ABERRATION

TECHNICAL FIELD

The present invention relates to an optical pick-up device, an optical disc apparatus using such an optical pick-up device, and a control method for such an optical pick-up device, and more particularly to an optical pick-up device including two object lenses mounted thereat and capable of optimally correcting comatic aberration with respect to the both object lenses, an optical disc apparatus using such an optical pick-up device, and a control method for such an optical pick-up device.

This Application claims priority of Japanese Patent Application No. 2004-363851, filed on Dec. 16, 2004, the entirety of which is incorporated by reference herein.

BACKGROUND ART

Hitherto, there are proposed and used disc drive apparatuses using, as recording medium, various optical discs such as CD (Compact Disc), DVD (Digital Versatile Disc), and/or BD (Blu-ray Disc), etc. etc.

Meanwhile, light beams used for reproducing CD, light beams used for performing recording of information onto DVD or performing reproduction of recorded information, and light beams used for performing recording of information onto BD or performing reproduction of recorded information have wavelengths different from each other. For example, the wavelength of light beams used for reproduction of CD is substantially 780 mm, the wavelength of light beams used for recording or reproduction of DVD is 650~660 nm, and the wavelength of light beams used for recording or reproduction of BD is substantially 405 nm.

Further, object lenses provided at optical pick-up devices (hereinafter referred to as optical pick-up units as occasion may demand) used for converging light beams onto CD, DVD and BD to perform recording or reproduction of information have numerical apertures (NA) different from each other.

Furthermore, in respective optical discs of CD, DVD and BD, thicknesses of disc bases (substrates) on which information recording layer is provided are different from each other.

There are provided disc drive apparatuses capable of selectively using optical discs different in the recording format, e.g., CD and DVD in which light beams different in wavelength are used and object lenses different in numerical aperture (NA) are further used as described above so that recording and/or reproduction of information are performed.

Further, there are proposed disc drive apparatuses capable of selectively using three kinds of optical discs of CD, DVD and BD which are different in the recording format.

In disc drive apparatuses of this kind, it is conceived to use optical pick-up units adapted for converging, by using single object lense, light beams having wavelengths different from each other, which are used in recording or reproduction of CD, DVD and BD, to irradiate the light beams thus converged onto the loaded optical disc. The optical pick-up units adapted for selectively converging, onto an optical disc, light beams different in wavelength by using single object lens as stated above have the problems that not only the object lens becomes large-sized so that enlargement of the unit itself cannot be avoided, but also manufacturing cost is increased.

In order to realize elimination of such problems, as optical pick-up units used in disc drive apparatuses adapted for selectively using three kinds of optical discs of CD, DVD and BD which are different in the recording format, optical pick-up units using two object lens are proposed and are provided in practice. Optical pick-up units of this kind each comprises an object lens for converging light beams for CD and DVD, and an object lens for converging light beams for BD.

It should be noted that, as optical pick-up units in which two object lenses are provided to respectively converge, by these object lenses, two kinds of light beams different in wavelength to irradiate the light beams thus converged onto an optical disc, there are optical pick-up units described in the Japanese Patent Application Laid Open No. 1999-23960 publication, the Japanese Patent Application Laid Open No. 1999-259891 publication and the Japanese Patent Application Laid Open No. 1999-64724 publication.

Meanwhile, optical pick-up units adapted to perform recording or reproduction with respect to three kinds of optical discs of CD, DVD and BD which are different in the recording format and adapted to converge three kinds of light beams which are different in wavelength by using two object lenses are required to have more rigorous accuracy for correction of aberration such as spherical aberration or comatic aberration, etc. as compared to optical pick-up units adapted to converge two kinds of light beams different in wavelength by using two object lenses.

Namely, in optical pick-up units in which two object lenses are provided so as to comply with two kinds of optical discs of CD and DVD to respectively converge two kinds of light beams different in wavelength by these object lenses, with respect to correction of aberration such as spherical aberration and/or comatic aberration, etc., adjustment of the optical system is performed at accuracy required for recording or reproduction of DVD so that the condition of correction accuracies of respective aberrations required for CD can be satisfied.

However, in optical pick-up units adapted for converging three kinds of light beams different in wavelength by using two object lenses in order to comply with three kinds of optical discs of CD, DVD and BD which are different in the recording format, it is required to correct aberration such as spherical aberration and/or comatic aberration, etc. taking place when object lens used in CD and DVD is used so that it falls within the range of accuracy required for DVD, and it is further required to correct aberration such as spherical aberration and/or comatic aberration, etc. taking place when object lens used in BD is used so that it falls within the range of accuracy required for BD.

In optical pick-up units adapted to comply with three kinds of optical discs of this kind, it is required for both two object lenses that aberration correction of high accuracy is performed.

Here, an example of a method of correcting aberration such as spherical aberration and/or comatic aberration, etc. taking place by light beams emitted from the optical pick-up unit comprising single object lens and irradiated onto an optical disc will be explained.

In the optical pick-up units of this kind, there are provided a comatic aberration correcting device for suppressing occurrence of aberration such as spherical aberration and/or comatic aberration, etc. taking place when light beams as described above are converged onto the signal recording surface of the optical disc, and a triaxial actuator serving as an object lens drive unit for allowing the object lens to undergo drive displacement. The triaxial actuator serves to allow an object lens for converging light beams onto the signal recording surface of the optical disc to undergo drive displacement, and is operative to allow the object lens to undergo drive displacement in three axes directions of a focus direction which is a direction in parallel to the optical axis of the object lens, a tracking direction which is a direction traversing recording tracks provided at the optical disc onto which light beams are irradiated and is a radial direction which is a direction perpendicular to the focus direction, and a radial tilt direction which is a rotational direction in which tangential direction of recording tracks is caused to be center.

The state where triaxial actuator as described above is used to allow the object lens to undergo drive displacement will be explained in more concrete terms.

As shown in FIG. 1, the optical pick-up unit comprising triaxial actuator is disposed within a disc drive apparatus in which a spindle motor 2 for performing rotational operation of an optical disc 1 is included.

The triaxial actuator is disposed in a manner facing the optical disc 1 which is caused to undergo rotational operation by the spindle motor 2, and is adapted so that an object lens 4 is mounted on a bobbin 3 caused to undergo drive displacement by the actuator.

Although not shown, light beams L emitted from light source such as semiconductor laser, etc. are converged by the object lens 4, and are irradiated onto the signal recording surface of the optical disc 1.

In the optical pick-up unit shown in FIG. 1, the object lens 4 mounted on the bobbin 3 is caused to undergo drive displacement by the triaxial actuator in three axes directions of focus direction F which is a direction in parallel to the optical axis of the object lens 4, tracking direction T which is a direction traversing recording tracks provided at the optical disc 1 onto which light beams L are irradiated and is a direction perpendicular to the focus direction F, and radial tilt direction Rad/Tilt which is a rotational direction in which tangential direction Tan which is a tangential direction of recording tracks is caused to be center.

It is to be noted that the radial tilt direction Rad/Tilt is a direction in which movement is performed in a circular arc form on the axis of the tracking direction T with the point A located below by a predetermined distance relative to the bobbin 3 being as center in FIG. 1. In addition, the direction in which movement is performed in a circular arc form on the axis of the tangential direction Tan with the point A being as center refers to the tangential tilt direction Tan/Tilt.

The triaxial actuator performs drive displacement of the bobbin 3 on the basis of a focus error signal obtained by detecting whether or not light beams L irradiated through the object lens 4 is in in-focus state on the signal recording surface of the optical disc 1, a tracking error signal obtained by detecting whether or not light beams L are positioned on recording tracks of the optical disc 1, and a radial tilt control signal obtained by detecting tilt quantity with respect to the optical disc 1 of light beams L so that the object lens 4 is caused to undergo drive displacement in the focus direction F, in the tracking direction T and in the radial tilt direction Rad/Tilt.

As the result of the fact that the object lens 4 is caused to undergo drive displacement in accordance with the above-described error signals of three axes directions, light beams L emitted from the object lens 4 are caused to be placed in in-focus state onto the signal recording surface of the optical disc 1, and are positioned on a predetermined recording track. Further, those light beams L are vertically incident on the signal recording surface of the optical disc 1 without being tilted thereto. As a result, it is possible to precisely scan recording tracks of the optical disc 1 by light beams L. Thus, it is possible to perform recording or reproduction with high accuracy.

DISCLOSURE OF THE INVENTION

Problems to be Solved by the Invention

In the optical pick-up unit device (unit) which will be explained with reference to FIG. 1, one object lens is mounted on one bobbin. In this case, as described above, two object lenses are mounted on one bobbin caused to undergo drive displacement to thereby allow respective two object lenses to undergo drive displacement in three axes directions of focus direction F, tracking direction T and radial tilt direction Rad/Tilt to allow light beams L respectively emitted from the respective object lenses to be placed in in-focus state on the signal recording surface of the optical disc 1, and to allow those light beams L to be positioned on a predetermined track thereof, thus permitting those light beams L to be vertically incident on the signal recording surface of the optical disc 1 without being tilted thereto.

Meanwhile, in the case where, in the optical pick-up device in which two object lenses are attached on one bobbin, assembling is performed such that inclination of the tangential tilt direction Tan/Tilt of one object lens with respect to the optical disc becomes minimum, it is extremely difficult to maintain inclination of the tangential tilt direction Tan/Tilt of the other object lens with high accuracy similarly to one object lens. As a result, in the case where light beams are irradiated onto the optical disc by using an object lens which cannot maintain assembling accuracy with high accuracy with respect to one object lens, large inclination would take place in the tangential tilt direction Tan/Tilt with respect to light beams. As a result, when light beams are irradiated onto the optical disc by using the other object lens, comatic aberration resulting from inclination of the light beams mentioned above would take place.

Since the optical pick-up device adapted for allowing the object lens to undergo drive displacement in three axes directions as described above has not a function to perform drive displacement in the tangential tilt direction, it is also impossible to perform correction of comatic aberration resulting from assembling error, etc. of optical elements including object lenses as described above.

As a method of correcting comatic aberration with respect to both two object lenses as described above, there is a method of assembling, after assembling of one object lens is completed, the other object lens onto the bobbin so that comatic aberration does not take place thereat in that state. However, it is extremely difficult to perform assembling of the other object lens in a manner stated above. Even if such an assembling can be performed, it is impossible to suppress comatic aberration taking place at the optical system except for the object lens.

As another method, a method of using quadriaxial actuator can be conceived. However, not only the configuration of the quadriaxial actuator extremely becomes complicated so that the optical pick-up device itself is large-sized, but also it is also difficult to dispose such quadriaxial actuator within a limited space of the disc drive apparatus. As a result, there is the possibility that detection sensitivity in detecting inclination in the tangential tilt direction with respect to optical disc of light beams may be lowered. Thus, it is difficult to perform precise control.

The present invention has been proposed in view of actual circumstances as described above, and aims at providing an optical pick-up device capable of easily and precisely correcting comatic aberration with respect to respective two object lenses mounted in the optical pick-up device, an optical disc apparatus using such an optical pick-up device, and a control method for such an optical pick-up device Still further objects of the present invention and practical merits obtained by the present invention will become more apparent from the embodiments which will be explained below with reference to the attached drawings.

BEST MODE FOR CARRYING OUT THE INVENTION

Embodiments of the present invention will now be explained in detail with reference to the attached drawings. It is a matter of course that the present invention is not limited to examples described below, but changes or modifications may be made as occasion demands within the scope which does not depart from the gist of the present invention.

A disc drive apparatus to which the present invention is applied uses, as recording medium, respective optical discs of CD (Compact Disc) in which reproduction of information is performed by using light beams having wavelength of substantially 780 nm, DVD (Digital Versatile Disc) in which recording or reproduction of information is performed by using light beams having wavelength of 650~660 nm, and BD (Blu-ray Disc) in which recording or reproduction of information is performed by using light beams having wavelength of substantially 405 nm which is shorter than the above.

Figure 1:
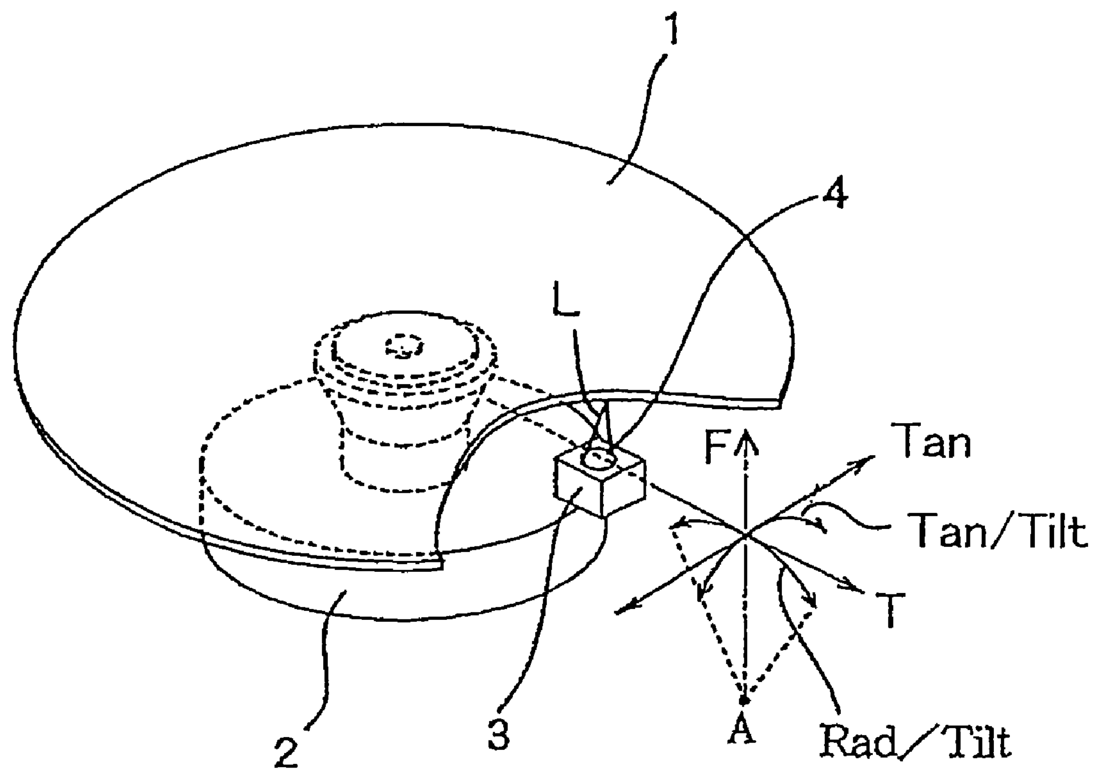
FIG. 1 is a perspective view showing the state where object lens is caused to undergo drive displacement with respect to optical disc in a conventional optical pick-up device.
Figure 2:
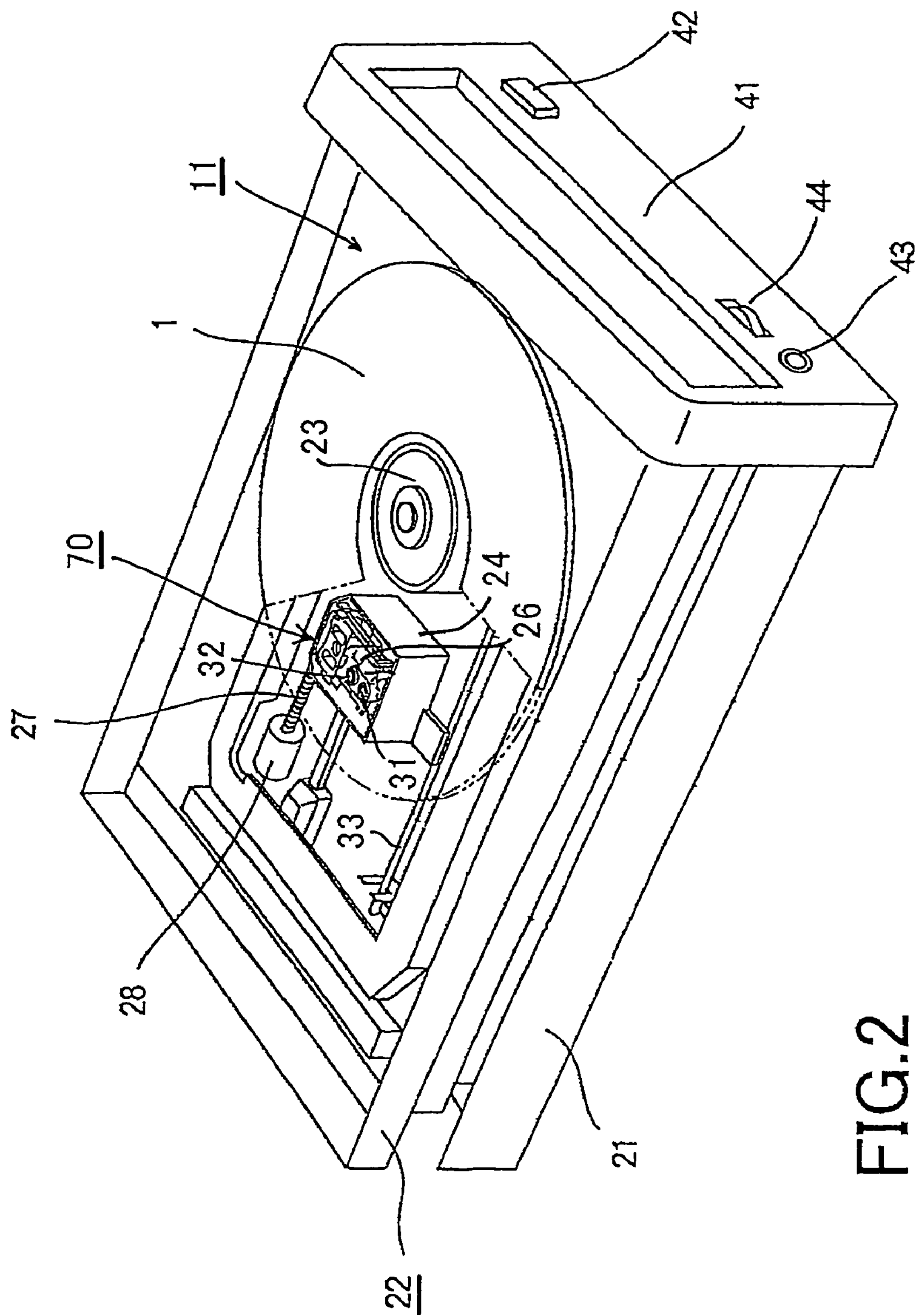
FIG. 2 is a perspective view showing a disc drive apparatus to which the present invention is applied.

The disc drive apparatus 11 has a configuration as shown in FIG. 2, and is attached to a main equipment such as personal computer or AV (Audio and Visual) equipment, etc. through a stationary plate 21. Moreover, an apparatus body 22 is fixed on the top face of the stationary plate 21.

Within the apparatus body 22, there is loaded an optical disc 1 selected from either one of CD, DVD and BD in which recording or reproduction is performed by the disc drive apparatus, and there is provided a spindle motor 23 for rotationally driving the loaded optical disc 1. The spindle motor 23 is disposed substantially at the central portion within the apparatus body 22 as shown in FIG. 2.

Within the apparatus body 22, there is provided an optical pick-up device (hereinafter referred to as optical pick-up unit as occasion may demand) 70 for irradiating light beams onto the optical disc 1 rotationally operated by the spindle motor 23 to perform recording of information onto the optical disc 1, or to perform reproduction of information recorded on the optical disc 1.

The optical pick-up unit 70 used here is caused to be of the configuration in which first and second object lenses 31, 32 are mounted on a common bobbin 26. Further, the bobbin 26 is supported by a triaxial actuator as an object lens drive unit for allowing the bobbin 26 to undergo drive displacement in three axes directions as described later to allow position and inclination of the first and second object lenses 31, 32 mounted on the bobbin 26 to undergo drive displacement, and is attached to a carriage 24. Within the carriage 24, although not shown, there is provided semiconductor laser as light source for emitting light beams irradiated onto the optical disc 1, and there is further disposed an optical system comprised of plural optical parts (components) for guiding, to the object lenses, light beams emitted from the semiconductor laser, or for guiding, to photo-detector, reflected light beams reflected from the optical disc 1 and incident on the object lenses 31, 32.

The optical pick-up unit 70 is supported by a feed screw 27 rotationally operated by a pick-up feed motor 28, and a movement guide shaft 33 disposed in parallel to the feed screw 27. When the feed screw 27 is rotationally operated by the pick-up feed motor 28, the optical pick-up unit 70 is caused to undergo movement operation in a tracking direction which is a radial direction of the optical disc 1 with the movement guide shaft 33 being as reference of movement direction.

Since the optical pick-up unit 70 used here is an optical pick-up unit used for recording or reproduction of CD, DVD and BD, it has a light source serving to emit light beams having a first wavelength of substantially 780 nm, light beams having a second wavelength of 650~660 nm, and light beams having a third wavelength of substantially 405 nm. The light source is constituted by using semiconductor laser, and is driven so as to emit light beams having a wavelength corresponding to the kind of the optical disc 1 loaded at the spindle motor 23.

In this example, the light source serving to emit light beams having first, second and third wavelengths comprises first, second and third light emitting elements for emitting light beams having respective wavelengths.

Further, the bobbin 26 on which the first and second object lenses 31, 32 are mounted is caused to undergo drive displacement by a triaxial actuator 75 which will be described later in three axes directions of focus direction F which is a direction in parallel to the optical axes of the object lenses 31, 32, tracking direction T which is a direction traversing recording tracks provided at the optical disc 1 onto which light beams L are irradiated and is a direction perpendicular to the focus direction F, and a radial tilt direction Rad/Tilt which is a rotational direction in which tangential direction Tan which is a tangential direction of recording tracks is caused to be center.

At the front surface of the apparatus body 22 of the disc drive apparatus 11 within which the spindle motor 23 and the optical pick-up unit 70 which are as described above are included, a front panel 41 is attached. At the front panel 41 side, an eject button 42 is provided. By operating the eject button 42, the disc drive unit (apparatus) 11 included within the main equipment is drawn out from the main equipment. Thus, loading/unloading of the optical disc 1 with respect to the disc drive unit 11 can be made.

In this example, at the front panel 41 side, there are provided a headphone jack 43 for outputting an audio signal obtained when the optical disc 1 is reproduced, and a volume knob 44 for adjusting an audio output.

Figure 3:
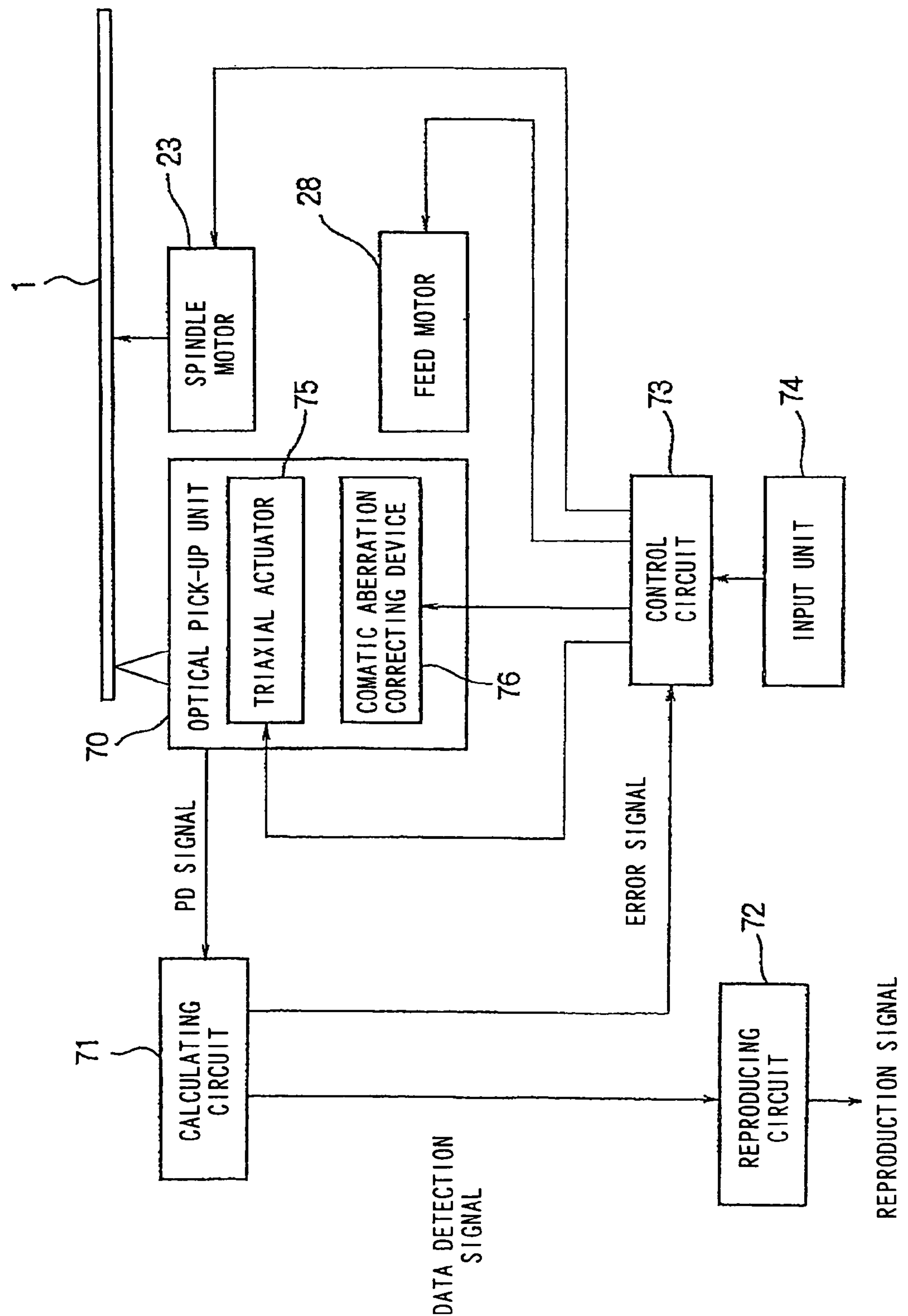
FIG. 3 is a block diagram showing a configuration from a functional point of view of the disc drive apparatus shown in FIG. 2.

Then, the internal configuration of the disc drive apparatus 11 having the configuration as described above will be explained in more concrete terms with reference to FIG. 3.

First, as described above, the optical pick-up unit 70 serves to emit, from the light source, light beams having a wavelength corresponding to the recording format of the optical disc 1 which has been loaded at the spindle motor 23 to irradiate the light beams thus emitted onto the signal recording surface of the optical disc 1 through the first or second object lens 31 or 32. Moreover, the optical pick-up unit 70 detects, by photo-detector (PD) which is light beam detector, reflected light beams which have been irradiated onto the optical disc 1 and have been reflected by the signal recording surface of the optical disc 1. The reflected light beams which have been detected by the photo-detector (PD) are converted into an electric signal by the photo-detector (PD). The electric signal thus obtained is outputted as a PD signal. The PD signal thus obtained is inputted to a calculating circuit 71.

Moreover, the optical pick-up unit 70 comprises a triaxial actuator 75 as an object lens drive unit for allowing the bobbin 26 on which the first and second object lenses 31, 32 are mounted to undergo drive displacement in three axes directions to allow the first and second object lenses 31, 32 mounted on the bobbin 26 to undergo drive displacement, and further comprises a comatic aberration correcting device 76 for correcting comatic aberration taking place in light beams irradiated onto the optical disc 1.

The triaxial actuator 75 allows the bobbin 26 to undergo drive displacement in three axes directions of focus direction F which is a direction in parallel to the optical axes of the object lenses 31, 32, tracking direction T which is a direction perpendicular to the focus direction F, and radial tilt direction Rad/Tilt which is a rotational direction in which tangential direction Tan is caused to be center to thereby conduct a control such that light beams emitted from the first or second object lens 31 or 32 are caused to be placed in in-focus state on the signal recording surface of the optical disc 1 and are positioned on a predetermined recording track, and those light beams are vertically incident on the signal recording surface of the optical disc 1 without being tilted thereto. As a result, it is possible to precisely scan recording tracks of the optical disc 1 by light beams. Thus, recording or reproduction is executed with high accuracy. The drive control of the triaxial actuator 75 is performed on the basis of a control signal outputted from a control circuit 73.

Moreover, the comatic aberration correcting device 76 serves to change refractive index of light beams transmitted therethough to thereby correct comatic aberration taking place in light beams irradiated onto the signal recording surface of the optical disc 1. The correcting operation of commatic aberration by the comatic aberration correcting device 76 will be further described later with reference to FIGS. 5 and 6.

The calculating circuit 71 supplied with a PD signal obtained by detecting reflected light beams from the optical disc 1 by photo-detector (PD) calculates, from the PD signal, a data detection signal for information reproduction (RF signal), a focus error signal and a tracking error signal to output the data detection signal to a reproducing circuit 72, and outputs the focus error signal and the tracking error signal to the control circuit 73.

The reproducing circuit 72 supplied with a data detection signal outputted from the calculating circuit 71 equalizes the data detection signal thus inputted thereafter to binarize the data detection signal thus obtained to further output a demodulated signal to the main unit as a reproduction signal while performing error correction.

Moreover, the control circuit 73 controls respective units of the disc drive apparatus 11 in accordance with an operation signal corresponding to operation of user which is delivered from an input unit 74.

For example, the control circuit 73 controls the spindle motor 23 in correspondence with an operation signal indicating reproduction start of the optical disc 1 delivered from the input unit 74 to rotationally operate the optical disc 1 at a predetermined velocity (angular velocity). Moreover, the control circuit 73 performs drive control of the pick-up feed motor 28 and the triaxial actuator 75 so that light beams which have been emitted from the optical pick-up unit 70 are positioned onto a predetermined recording track of the optical disc 1.

Further, the control circuit 73 performs drive control of the triaxial actuator 75 on the basis of a focus error signal and a tracking error signal obtained by detecting reflected light beams reflected from the optical disc 1 by photo-detector (PD) to thereby conduct such a control to allow the bobbin 26 to undergo drive displacement in the focus direction and in the tracking direction so that light beams passed (transmitted) through the first or second object lens 31 or 32 are caused to be placed in in-focus state on the signal recording surface of the optical disc 1, and are positioned on a desired recording track. Moreover, the control circuit 73 allows the triaxial actuator 75 to undergo drive displacement to further control the comatic aberration correcting device 76 to thereby correct comatic aberration taking place in light beams transmitted through the first and second object lenses 31, 32 and incident on the optical disc 1.

Here, a practical configuration of the triaxial actuator 75 disposed within the carriage 24 of an optical pick-up unit 70 will be explained with reference to FIG. 4.

Figure 4:
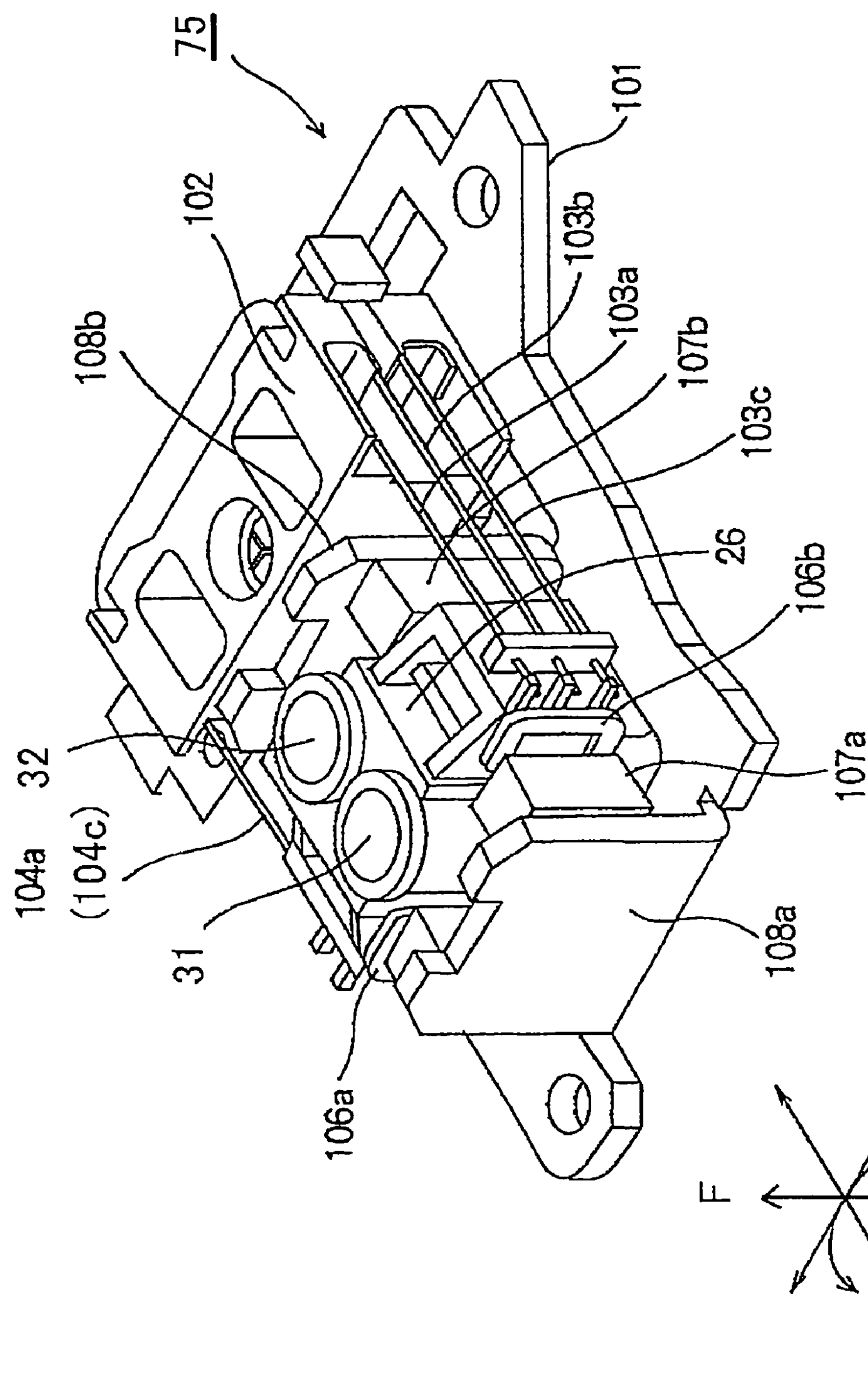
FIG. 4 is a perspective view showing triaxial actuator portion of optical pick-up device.

As shown in FIG. 4, the triaxial actuator 75 comprises a thin flat plate-shaped base 101, wherein a stationary member 102 is attached at the position of the right side in FIG. 4 which is one side of the upper surface side of the base 101.

The bobbin 26 on which the first and second object lenses 31, 32 are mounted is supported by suspension wires 103*a* to 103*c* and 104*a* to 104*c* provided on the left and right sides by respective three wires in the state where the base end portion side is supported at the stationary member 102. Namely, the bobbin 26 is supported by six suspension wires in total consisting of left three suspension wires and right three suspension wires.

Here, when the optical pick-up unit 70 is attached to the disc drive apparatus 11, the first and second object lenses 31, 32 are mounted on the bobbin 26 so that they are arranged in the tangential direction Tan which is tangential direction of recording tracks provided at the optical disc 1 caused to undergo rotational operation by the spindle motor 23. In this example, extension direction of the suspension wires 103*a* to 103*c* and 104*a* to 104*c* for supporting the bobbin 26 is caused to be tangential direction Tan.

In the triaxial actuator 75 constituting the optical pick-up unit 70 according to the present invention, focusing coil and tilt coil (which are not shown) are wound on the outer circumferential surface of the bobbin 26, and respective pair of first and second tracking coils 106*a*, 106*b* are attached at respective side surfaces positioned in the tangential direction of the bobbin 26. In the triaxial actuator 75, magnets 107*a*, 107*b* are arranged in a manner to face to each other with the bobbin 26 being put therebetween in the tangential direction. These magnets 107*a*, 107*b* are fixed at yokes 108*a*, 108*b* formed in such a manner that a portion of the base 101 is bent.

Moreover, the respective magnets 107*a*, 107*b* are arranged in such a manner that they are opposite to the first and second tracking coils 106*a*, 106*b*, and are opposite to focusing coil and tilt coil which are not shown.

When drive currents corresponding to a control signal outputted from the control circuit 73 are delivered to the focusing coil, and the first and second tracking coils 106*a*, 106*b* and the tilt coil, the triaxial actuator 75 allows the bobbin 26 supported by the six suspension wires 103*a* to 103*c* and 104*a* to 104*c* to undergo drive displacement in three axes directions of focus direction F, tracking direction T which is a direction perpendicular to the focus direction F and radial tilt direction Rad/Tilt in which tangential direction Tan is caused to be center by action between drive currents flowing in respective coils and magnetic fields from the magnets 107*a*, 107*b*.

Then, the optical system of the optical pick-up unit 70 according to the present invention will be explained with reference to FIG. 5.

The optical pick-up unit 70 according to the present invention comprises first and second optical systems. The first optical system is composed of a first semiconductor laser 141 serving as a first light source, a first collimator lens 142 and a first object lens 31. Moreover, the second optical system is composed of a second semiconductor laser 241 serving as a second light source, a second collimator lens 242, a comatic aberration correcting device 76, and a second object lens 32.

The first semiconductor laser 141 constituting the first optical system emits light beams $L_1$ having a wavelength of 405 nm used for recording/reproduction of BD. The light beams $L_1$ which have been emitted from the first semiconductor laser 141 are changed into rays of parallel light by the first collimator lens 142. The rays of light thus obtained are incident on the first object lens 31. The first object lens 31 converges the light beams $L_1$ which have been incident onto the signal recording surface of the optical disc 1 to irradiate the light beams thus converged to form light spot. In this example, the first object lens 31 is disposed so that it is positioned on the center line in which the optical axis center is passed through the center of the optical disc 1.

The second semiconductor laser 241 constituting the second optical system emits two kinds of light beams different in wavelength of light beams $L_2$ having a wavelength of 660 nm used for recording or reproduction of DVD and light beams $L_3$ having a wavelength of 780 nm used for CD. Light beams $L_2$, $L_3$ emitted from the second semiconductor laser 241 are changed into rays of parallel light by the second collimator lens 242, and are incident on the second object lens 32 through the comatic aberration correcting device 76. The second object lens 32 converges the light beams $L_2$, $L_3$ which have been incident onto the signal recording surface of the optical disc 1 to irradiate the light beams thus converged to form light spot.

Meanwhile, when the first and second object lenses 31, 32 are assembled on the bobbin 26 in the optical pick-up unit 70 according to the present invention, they are assembled so that inclination of the tangential tilt direction Tan/Tilt of either one of object lenses 31, 32 becomes minimum. In this embodiment, the first object lens 31 constituting the first optical system of the optical pick-up unit 70 is assembled on the bobbin 26 so that the inclination of the optical axis thereof in the tangential tilt direction Tan/Tilt with respect to the optical disc 1 becomes minimum. As a result, correction of comatic aberration of the first optical system is realized.

In this example, for correction of comatic aberration, not only adjustment of assembling accuracy of the first object lens 31, but also adjustment of assembling accuracy of other optical parts (components) such as first collimator lens 142 for guiding light beams $L_1$ which have been emitted from the first semiconductor laser 141 to the first object lens 31, etc. are performed as occasion demands.

Accordingly, in the first optical system, the optical axis of the first object lens 31 is caused to be in parallel to focus direction F with high accuracy so that there results no inclination with respect to the tangential tilt direction Tan/Tilt. Thus, it is possible to suppress occurrence of comatic aberration of light beams $L_1$ transmitted through the first object lens 31 and then converged. Further, drive displacement is performed by the triaxial actuator 75 so that errors in the focus direction F, in the tracking direction T and in the radial tilt direction Rad/Tilt are controlled.

On the other hand, similarly to the first object lens 31 constituting the first object lens 31, drive displacement is performed by the triaxial actuator 75 so that errors in the focus direction F, in the tracking direction T and in the radial tilt direction Rad/Tilt of the second object lens 33 constituting the second optical system are controlled.

In the optical pick-up unit 70 according to this embodiment, the first object lens 31 constituting the first optical system is assembled onto the bobbin 26 so that inclination of the optical axis thereof in the tangential tilt direction Tan/Tilt with respect to the optical disc 1 becomes minimum, but the second object lens 32 constituting the second optical system is assembled onto the bobbin 26 with such an accuracy required for the first object lens 31. As a result, in the second object lens 32, it is impossible to modify inclination in the tangential tilt direction Tan/Tilt to maintain, with high accuracy, its optical axis so that it has a direction in parallel to focus direction F perpendicular to the signal recording surface of the optical disc 1.

Namely, in the second optical system, comatic aberration more than comatic aberration which has been modified at the first optical system would take place.

For the purpose of correcting comatic aberration taking place in light beams irradiated onto the optical disc 1, which results from the fact that the second object lens 32 cannot sufficiently correct inclination of tangential tilt direction Tan/Tilt, and/or the fact that adjustment of assembling accuracy of other optical elements is not sufficiently performed as stated above, the comatic aberration correcting device 76 is provided. As shown in FIG. 5, the comatic aberration correcting device 76 is disposed between the second object lens 32 and the second collimator lens 242.

Then, the comatic aberration correcting device 76 will be explained with reference to FIGS. 6A and 6B.

The comatic aberration correcting device 76 is comprised of two transparent bases (substrates) 161, 162 consisting of material such as glass or plastic, etc. These transparent bases 161, 162 overlap with each other, and are connected in the state where they are stuck by adhesive agent 163 of epoxy or acrylic system at one side of rectangle of the overlapped transparent bases.

Figure 6A:
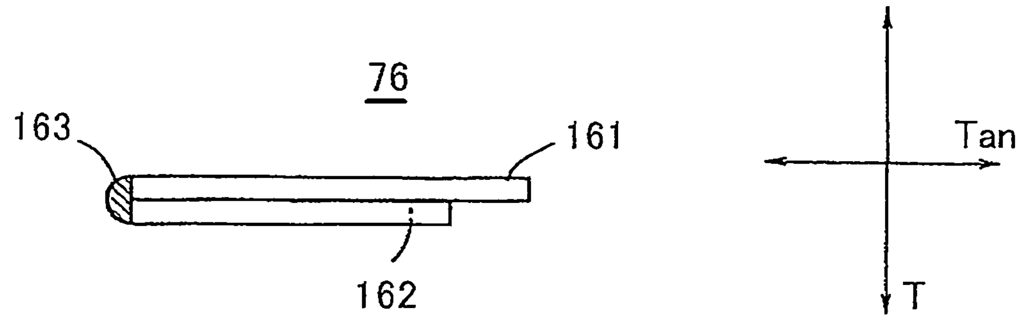
FIG. 6A is a plan view showing comatic aberration correcting device.
Figure 6B:
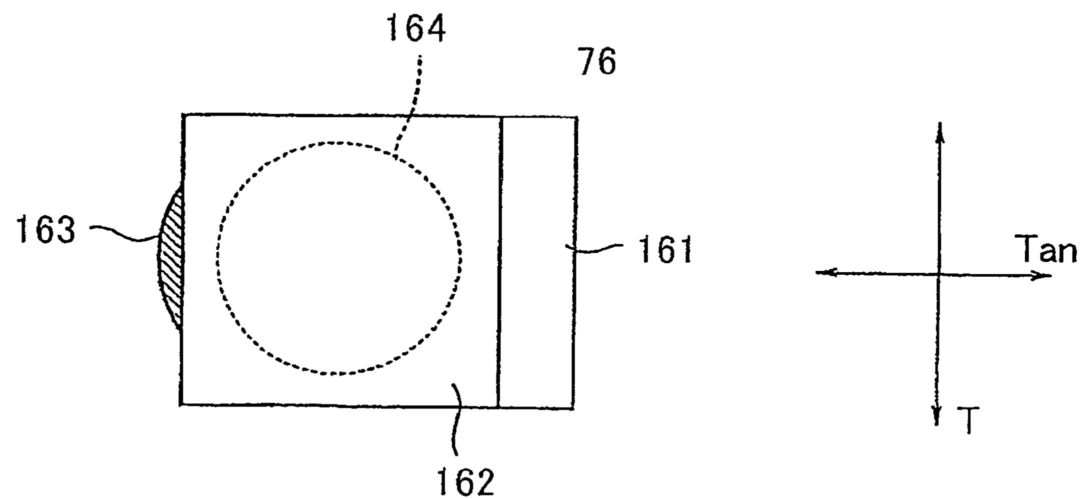
FIG. 6B is a side view thereof.

In the comatic aberration correcting device 76, liquid crystal is injected from injection hole (not shown) into an area 164 encompassed by a predetermined circle indicated by dotted lines in FIG. 6A between the two transparent bases 161, 162 so that liquid crystal layer is formed. Further, the liquid crystal layer is divided into several areas substantially symmetrical with respect to the tangential direction Tan in order to correct comatic aberration taking place in light beams $L_2$, $L_3$ transmitted through the second object lens 32 of the second optical system.

The liquid crystal has the characteristic that when a predetermined voltage is applied thereto, orientation of liquid crystal molecules changes in accordance with an electric field produced by the applied voltage. By making use of this characteristic, the comatic aberration correcting device 76 can arbitrarily adjust, every divided areas, refractive index within a plane surface perpendicular to traveling direction of light beams $L_2$, $L_3$ transmitted therethrough. Namely, the comatic aberration correcting device 76 changes refractive index of light beams $L_2$, $L_3$ every divided areas, thereby making it possible to correct comatic aberration in the tangential tilt direction Tan/Tilt taking place in the second optical system.

Accordingly, in the optical pick-up unit 70 in which first and second object lenses 31, 32 are mounted on the common bobbin 26, the first object lens 32 is assembled onto the bobbin 26 so that comatic aberration in the tangential tilt direction Tan/Tilt becomes minimum in the first optical system including the first object lens 31, and the comatic aberration correcting device 76 is disposed between the second object lens 32 and the second collimator lens 242 in the second optical system comprising the second object lens 32 so that comatic aberration resulting from error in the tangential tilt direction Tan/Tilt taking place relative to the first optical system is corrected. Namely, in the optical pick-up unit 70 where first and second object lenses 32, 32 are mounted on bobbin 26, also in both optical systems of the first optical system comprising first object lens 31 and the second optical system comprising second object lens 32, it is possible to suppress occurrence of comatic aberration to irradiate light beams $L_1$, $L_2$, $L_3$ onto the signal recording surface of the optical disc 1 in an optimum state.

As stated above, in the optical pick-up unit 70 where first and second object lenses 31, 32 are mounted on common bobbin 26, first object lens 31 is assembled onto the bobbin 26 in the first optical system including first object lens 31 so that comatic aberration in the tangential tilt direction Tan/Tilt becomes minimum, and comatic aberration in the tangential tilt direction Tan/Tilt can be corrected by the comatic aberration correcting device 76 even if such a high accuracy assembling adjustment is not performed with respect to the second optical system comprising second object lens 32. It is to be noted that the comatic aberration correcting device 76 provided at the second optical system side performs not only correction of comatic aberration resulting from assembling error of the second object lens 32 assembled onto the bobbin 26, but also correction of comatic aberration resulting from optical elements except for the second object lens 32.

In this example, with respect to errors in the focus direction F which is a direction in parallel to the optical axes of the first and second object lenses 31, 32 attached on the common bobbin 26, in the tracking direction T which is a direction perpendicular to the focus direction F, and in the radial tilt direction Rad/Tilt which is a rotational direction in which tangential direction Tan is caused to be center, the bobbin 26 is caused to undergo drive displacement by the triaxial actuator 75 on the basis of error signals in respective directions so that modification control is performed.

Figure 7:
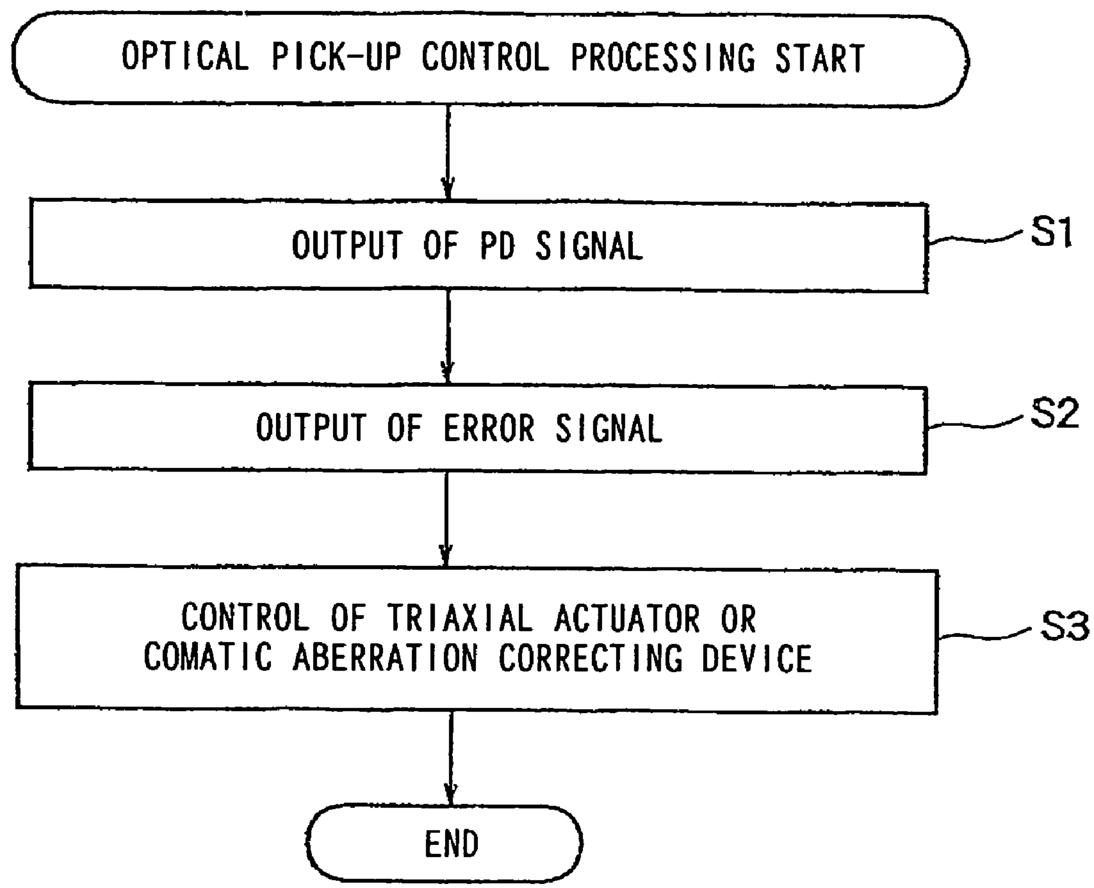
FIG. 7 is a flowchart for explaining optical pick-up control processing of the disc drive apparatus.

Then, control operation of the disc drive apparatus 11 in which the optical pick-up unit 70 according to the present invention is assembled will be explained with reference to the flowchart of FIG. 7.

In this disc drive apparatus 11, the input unit 74 is operated by user. When an operation signal indicating, e.g., reproduction start is inputted from the input unit 74, the control circuit 73 rotationally drives the spindle motor 23 of the disc drive apparatus 11 to allow the optical disc 1 loaded at the spindle motor 43 to undergo rotational operation. At step S1 where rotation of the optical disc 1 is started, the optical pick-up unit 70 is driven so that light beams L are emitted from the first or second semiconductor laser 141 or 142. As a result, the light beams L thus obtained are irradiated onto the optical disc 1. Reflected light beams irradiated onto the signal recording surface of the optical disc 1 and reflected from the signal recording surface are detected by photo-detector (PD) which is light beam detector. A signal obtained by converting the reflected light beam thus detected into an electric signal is outputted to the calculating circuit 71 as a PD signal. Thus, processing proceeds to step S2.

At the step S2, the calculating circuit 71 calculates data detection signal for information reproduction (RF signal), focus error signal and tracking error signal from the PD signal delivered from the optical pick-up unit 70 to output the data detection signal to the reproducing circuit 72, and to output the focus error signal and the tracking error signal to the control circuit 73. Thus, processing proceeds to step S3.

At the step S3, the control circuit 73 performs drive control of the spindle motor 23 and the pick-up feed motor 28, further controls the triaxial actuator 75 on the basis of the focus error signal, the tracking error signal and the tilt control signal which are delivered from the calculating circuit 71, and furthermore controls the comatic aberration correcting device 76. Further, simultaneously with completion of reproduction of the optical disc 1, the control processing of the optical pick-up unit 70 is completed.

Meanwhile, in the optical pick-up unit 70, in the case where first and second object lenses 31, 32 are mounted on the common bobbin 26, the unit itself become large-sized as compared to the optical pick-up unit in which only one object lens is mounted. Enlargement of the optical pick-up unit 70 leads to the problems in which the optical pick-up unit 70 fails to be accommodated within a predetermined space of the disc drive apparatus 11, or there results no margin within the apparatus 11 even if the optical pick-up unit 70 can be accommodated, and/or the problem that balance of the optical pick-up unit 70 is deteriorated so that it is difficult to conduct a control, etc.

Then, in view of the above, an example in which the optical pick-up unit 70 is further miniaturized will be explained.

Figure 8:
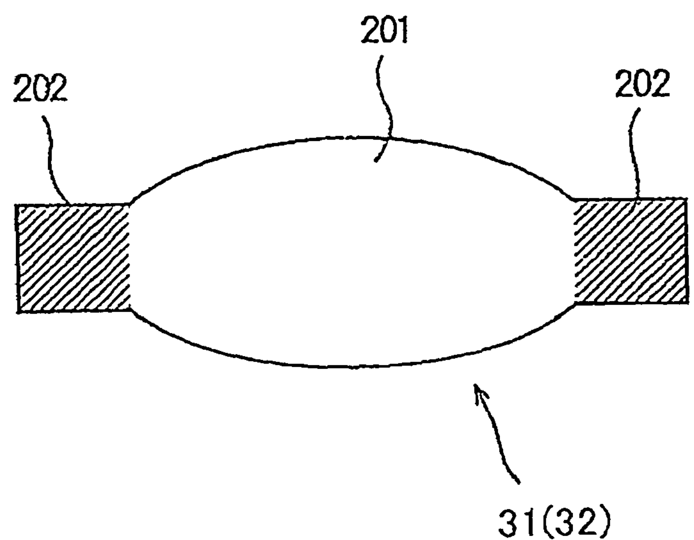
FIG. 8 is a side view showing first or second object lens.

FIG. 8 shows a side view of first or second object lens 31, 32 mounted on the above-described bobbin 26 shown in FIG. 4.

The first or second object lens 31 or 32 comprises a lens body 201, and a flange portion 202 for performing fixing with respect to the bobbin 26.

The first or second object lens 31 or 32 is adapted so that the lens body 201 is formed so as to converge light beams transmitted therethrough. The flange portion 202 is a portion where there is no influence on converging of light beams, and serves as an adhering (connecting) portion with respect to the bobbin 26.

Figure 9:
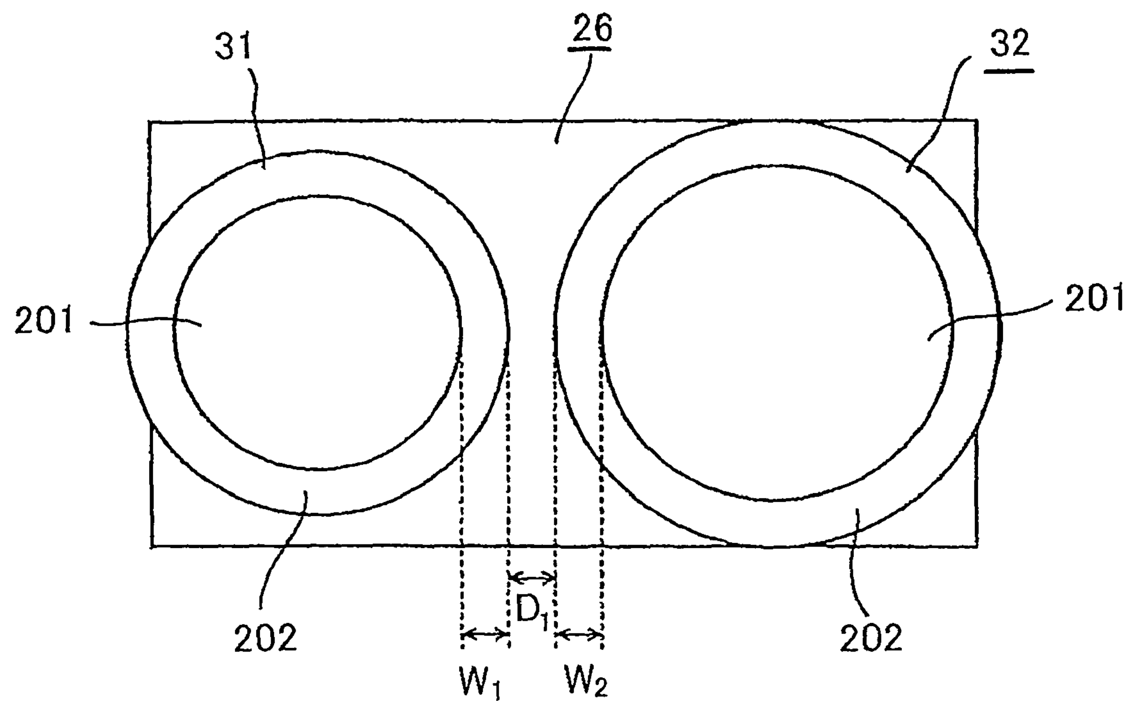
FIG. 9 is a plan view showing bobbin.

FIG. 9 shows the upper surface side of the plane surface on which first and second object lenses 31, 32 of the bobbin 26 shown in FIG. 4 are mounted.

As shown in FIG. 9, the first object lens 31 and the second object lens 32 are arranged in a manner spaced by a predetermined spacing, e.g., spacing $D_1$ of 0.2 mm. In this example, width $W_1$ of the flange portion 202 of the first object lens 31 is caused to, e.g., 0.2 mm, and width $W_2$ of the flange portion 202 of the second object lens 32 is caused to be, e.g., 0.2 mm. It should be noted that spacing $D_1$ between first and second object lenses 31, 32 and widths $W_1$, $W_2$ of respective flange portions 20 are not limited to the above-described numerical values.

In the case where the first and second object lenses 31, 32 are lenses of plastic, it is general that these object lenses 31, 32 are manufactured in a manner described below. Namely, the object lenses 31, 32 are injection-molded in the state where cavity of the metal mold unit for molding is connected to respective front ends of rod-shaped runners which take cross shape or radial shape. Further, the gate portions serving as connecting portions between the first and second object lenses 31, 32 and the rod-shaped runners are cut, i.e., are gate-cut so that the gate portions are separated into respective object lenses 31, 32.

In view of the above, in separating the object lenses 31, 32 from the rod-shaped runners, the flange portions 202 of the object lenses 31, 32 are cut without cutting the gate portions of the object lenses 31, 32 to thereby further miniaturize the object lenses 31, 32 to shorten, by size corresponding to the miniaturized lens portion, the distance between respective centers of the first and second object lenses 31, 32 mounted on single bobbin 26, thus making it possible to realize miniaturization of the bobbin 26.

Then, another example in which further miniaturization of the optical pick-up unit 70 is realized will be explained with reference to FIG. 10.

In this optical pick-up unit 70, in place of the first object lens 31 shown in FIG. 9, a first object lens 231 is mounted on a bobbin 221 along with the second object lens 32 similar to that of FIG. 9.

Figure 10:
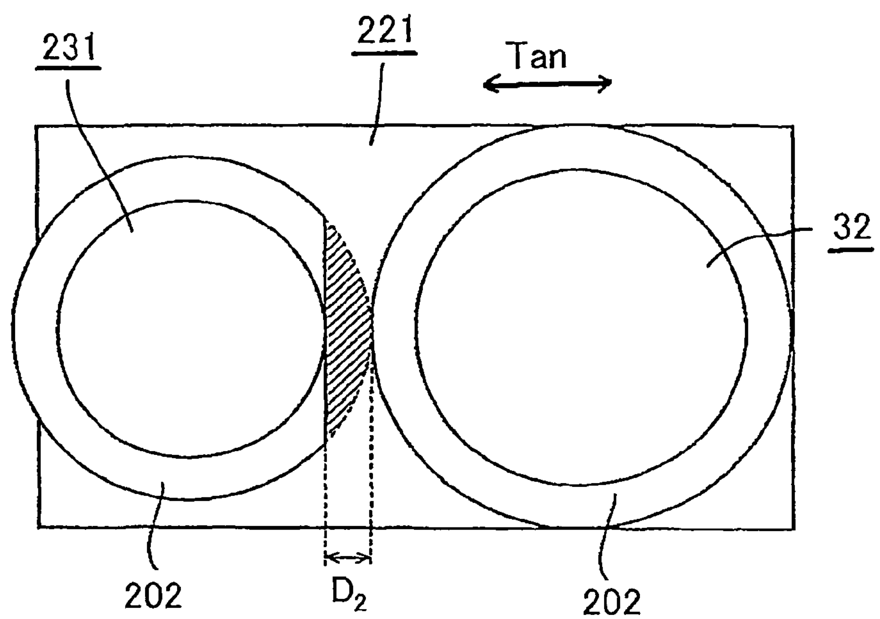
FIG. 10 is a plan view showing another example of bobbin.

At the first object lens 231, the portion to which slanting lines are attached in FIG. 10, which is in close vicinity to the second object lens 32 of the flange portion 202 is linearly cut. The spacing $D_2$ between the first object lens 231 and the second object lens 32 is maintained to be 0.2 mm, whereas the distance between centers of the first object lens 231 and the second object lens 32 can be shortened by width corresponding to the cut portion in close vicinity to the second object lens 32 of the flange portion 202, e.g., 0.2 mm. Thus, size (width) in the tangential direction Tan which is lateral direction in FIG. 10 of a bobbin 221 can be miniaturized by about 0.2 mm as compared to the bobbin 26 shown in FIG. 9.

Further, a further example where further miniaturization of the optical pick-up unit 70 is realized will be explained with reference to FIG. 11.

In this optical pick-up unit 70, in place of the second object lens 32 of FIG. 10, a second object lens 251 is mounted on a bobbin 241 along with the first object 231 similar to that of FIG. 10.

In the second object lens 251, the portion in close vicinity to the first object lens 231 of the flange portion 202 is linearly cut. Namely, the spacing $D_3$ between the first object lens 231 and the second object lens 251 is maintained to be 0.2 mm, whereas the distance between centers of the first object lens 231 and the second object lens 251 can be shortened by 0.2 mm of width corresponding to the cut portion in close vicinity to the first object lens 231 of the flange portion 202. Thus, size (width) in the tangential direction Tan which is lateral direction in FIG. 11 of the bobbin 221 can be also miniaturized by about 0.4 mm as compared to the bobbin 26 shown in FIG. 9.

Further, a still further example in which still further miniaturization of the optical pick-up unit 70 is performed will be explained with reference to FIG. 12.

In the optical pick-up unit 70, in place of the object lens 31 shown in FIG. 9, a first object lens 271 is mounted on a bobbin 261 along with the second object lens 32 similar to that of FIG. 9.

At the first object lens 271, the portion in close vicinity to the second object lens 32 of the flange portion 202 is linearly cut. In this example, the flange portion 202 of the first object lens 271 is cut along outer shape of the second object lens 32. Further, the cut recessed portion of the flange portion 202 of the first object lens 271 and the second object lens 32 are arranged in a manner close to each other. Thus, size (width) in the tangential direction Tan which is lateral direction in FIG. 12 of the bobbin 261 can be also miniaturized, as compared to the bobbin 26 shown in FIG. 9, by about 0.4 mm which is sum of 0.2 mm corresponding to width of the flange portion 202 of the first object lens 271 and 0.2 mm corresponding to distance between respective lenses.

Figure 11:
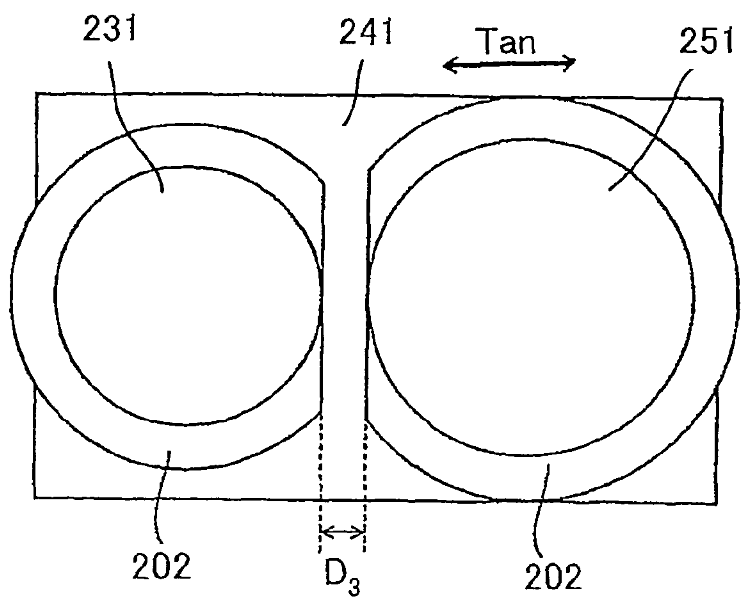
FIG. 11 is a plan view showing a further example of bobbin.
Figure 12:
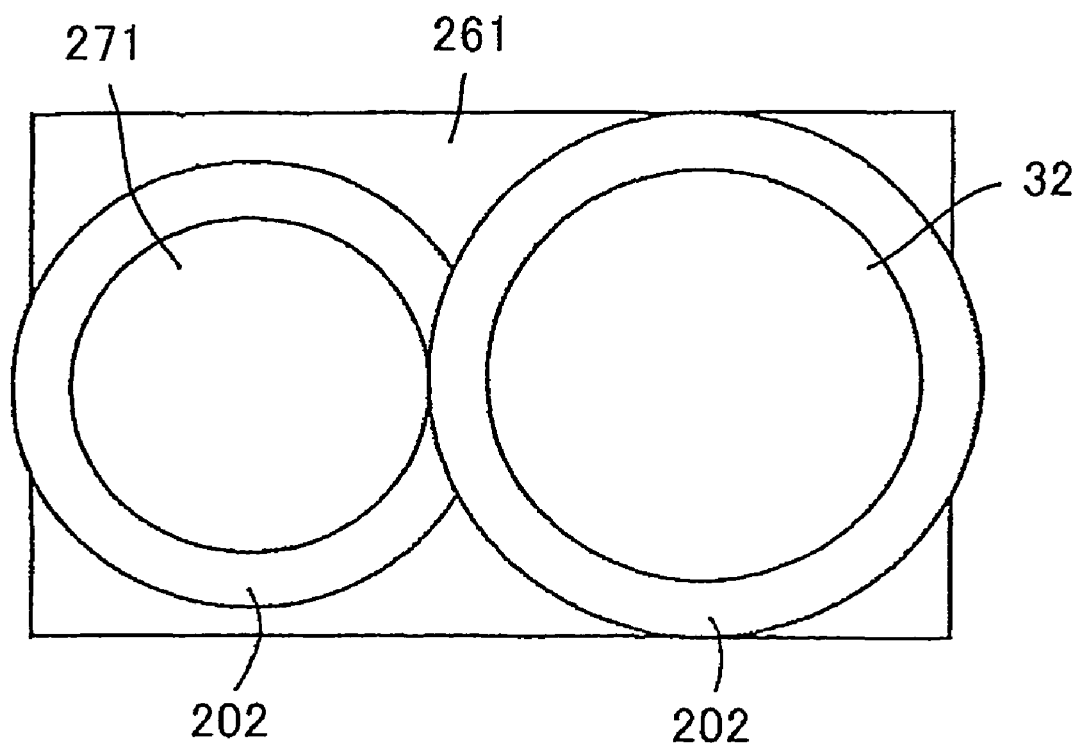
FIG. 12 is a plan view showing a still further example of bobbin.

As shown in FIGS. 10 to 12, the flange portion 202 in which there is no influence of light converging operation of at least one of the first and second object lenses is cut. The first and second object lenses are arranged in a manner close to each other in accordance with width corresponding to the cut portion of the flange portion 202, thereby making it possible to miniaturize the bobbin which mounts these object lenses. Further, miniaturization of the entirety of the optical pick-up unit 70 can be also made.

Moreover, shortening distance between centers of two object lenses mounted on single bobbin 26 also provides the effects described below.

In a tracking control method of controlling tracking portion with respect to the optical disc of light beams, there is three-beam method using three light beams. The three-beam method is a technique in which sub-beams are prepared at both sides of main beam to control position of the object lens so that reflected light intensities from sub-beams become constant.

Figure 5:
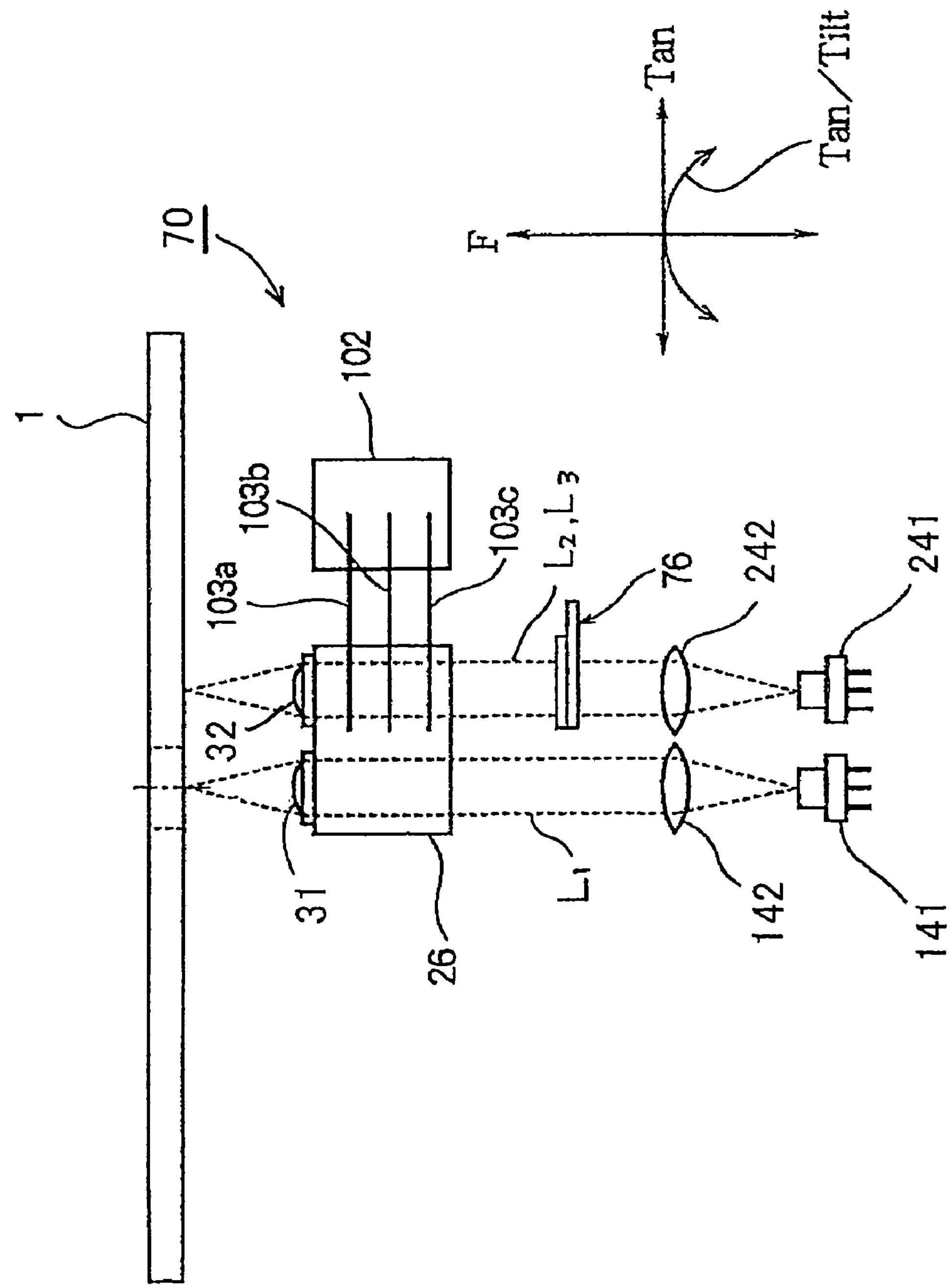
FIG. 5 is a view for explaining an optical system of the optical pick-up device.

As shown in FIG. 5, in the optical pick-up unit 70 in which two object lenses are arranged in the tangential direction, in the case where one object lens (first object lens 31 in FIG. 5) is disposed on the same diameter line (radial direction of the optical disc 1), the other object lens (second object lens 32) would deviate from the center line passing through the center of the optical disc 1.

On the central line of the optical disc 1, recording tracks are vertical with respect to the radial direction also at all portions from the outer circumferential side to the inner circumferential side of the optical disc 1. Thus, positions of sub-beams with respect to the recording tracks are substantially the same from outer circumference to inner circumference of the optical disc 1. On the other hand, in the case where the object lens deviates in the tangential direction from the central line of the optical disc 1 as in the case the second object lens 32, shift between position of sub-beam with respect to recording tracks at outer circumference of the optical disc 1 and position of sub-beam with respect to recording tracks at inner circumference of the optical disc is large by change of curvature of recording tracks according as distance from the position on the central line is increased. For this reason, it becomes difficult to perform precise tracking control at all positions from the outer circumferential side up to the inner circumferential side of the optical disc 1.

Accordingly, in the optical pick-up unit 70 in which two object lenses are arranged in the tangential direction, shortening distance between centers of the object lenses, i.e., realization of miniaturization of the optical pick-up unit 70 provides the effect or advantage that tracking control with respect to object lenses in which the optical axis center is not positioned on the center line of the optical disc is facilitated, and detection sensitivity is enhanced in the case where the three-beam method is employed as the tracking control method.

Moreover, miniaturization of the optical pick-up unit 70 contributes to enhancement of rigidity of the optical pick-up unit 70, and/or lighting in weight of the optical pick-up unit 70.

It is to be noted that while explanation has been given in the above-described examples by taking an example where the object lens is formed by plastic, the flange portion may be similarly cut also with respect to the case where the object lens is formed by glass thus to have ability to miniaturize the bobbin.

While explanation has been given in the above-described embodiments in connection with the optical pick-up unit (device) in which two object lenses are arranged in the tangential direction, two object lenses may be arranged in the radial direction.

It is to be noted that while, as explained with reference to FIG. 4, in the case where two object lenses are arranged in line in the tangential direction, the triaxial actuator 75 controls positional shifts in the focus direction, in the tracking direction and in the radial tilt direction, and the comatic aberration correcting device 76 performs control in the tangential tilt direction, in the case where two object lenses are arranged in line in the radial direction, the triaxial actuator 75 may control, in order to ensure working distance (W.D.) with respect to the optical disc 1, positional shifts in the focus direction, in the radial direction and in the tangential tilt direction, and the comatic aberration correcting device 76 may correct positional shift in the radial tilt direction.

In other words, the comatic aberration correcting device 76 can be disposed in such a manner to correct comatic aberration in either one of tangential tilt direction and radial tilt direction.

In addition, since the comatic aberration correcting device 76 may be provided at either one of the first and second optical systems in which skew adjustment which is tilt adjustment of high accuracy cannot be executed, in the case where there takes place inclination in the first optical system positioned on the central line passing through the center of the optical disc, the comatic aberration correcting device 76 is disposed between the first collimator lens 142 and the first object lens 31 of the first optical system.

It should be noted that it is a matter of course that steps described in the flowchart includes not only processing performed in a time series manner along sequence described, but also processing executed in parallel or individually even if processing is not necessarily performed in a time series manner.

It is to be noted that while the invention has been described in accordance with certain preferred embodiments thereof illustrated in the accompanying drawings and described in the above description in detail, it should be understood that the invention is not limited to embodiments, but various modifications, alternative constructions or equivalents can be implemented without departing from the scope and spirit of the present invention as set forth and defined by the appended claims.

The invention claimed is:

1. An optical pick-up device and disk drive apparatus comprising:

a first light emitting element for emitting first light beams having a first wavelength;

a second light emitting element for emitting second light beams having a second wavelength;

a third light emitting element for emitting third light beams having a third wavelength;

a first collimator lens that changes one of the first, second, or third light beams emitted from the first, second, or third light emitting element into first rays of parallel light;

a second collimator lens that changes one of the first, second, or third light beams emitted from the first, second, or third light emitting element into second rays of parallel light;

a first optical system including a first object lens, and serving to converge, by the first object lens, the first rays of parallel light and to irradiate the light beams converged by the first object lens onto an optical disc;

a second optical system including a second object lens, and serving to converge, by the second object lens, the second rays of parallel light and to irradiate the light beams converged by the second object lens onto the optical disc;

an object lens drive unit including a bobbin that holds the first and second object lenses, and serves to drive the bobbin to undergo a drive displacement in a focusing direction perpendicular to a recording surface of the optical disc, a tracking direction which is one substantially radial direction of the optical disc, and one of a radial tilt direction in which movement is performed in a circular direction on an axis of the one substantially radial direction and a tangential tilt direction in which movement is performed in a circular direction on an axis of a tangential direction which is a direction perpendicular to the one substantially radial direction;

a comatic aberration correcting device for correcting a comatic aberration of the second optical system relatively taking place with respect to the first optical system in one of the radial tilt direction and the tangential tilt direction, which is not controlled by the object lens drive unit, and the comatic aberration correcting device is arranged in an optical path of the second optical system between the second collimator lens and the second object lens and out of an optical path of the first optical system;

a photo-detector for receiving light beams reflected from the optical disc; and a control circuit connected to the photo-detector for controlling the comatic aberration connecting device in response to the detected reflected light beams, wherein, each of the first and second object lenses includes a converging portion that converges light and a flange that connects to the bobbin surrounding the converging portion, and a portion of the flange of one of the first and second object lenses is removed and the other one of the first and second object lenses is arranged to overlap the portion of the flange that is removed, so that a distance between the converging portion of the first object lens and the converging portion of the second object lens is equal to a width of the flange of the one of the first and second object lenses that is removed.

2. An optical disc apparatus comprising:

a disc rotational operation device for rotationally driving an optical disc; and an optical pick-up device configured to scan, by light beams, a signal recording surface of an optical disc driven by the disc rotational operation device to record or reproduce information, the optical pick-up device comprising:

a first light emitting element for emitting first light beams having a first wavelength;

a second light emitting element for emitting second light beams having a second wavelength;

a third light emitting element for emitting third light beams having a third wavelength;

a first collimator lens that changes one of the first, second, or third light beams emitted from the first, second, or third light emitting element into first rays of parallel light;

a second collimator lens that changes one of the first, second, or third light beams emitted from the first, second, or third light emitting element into second rays of parallel light;

a first optical system including a first object lens, and serving to converge, by the first object lens, the first rays of parallel light and to irradiate the light beams converged by the first object lens onto the optical disc;

a second optical system including a second object lens, and serving to converge, by the second object lens, the second rays of parallel light and to irradiate the light beams converged by the second object lens onto the optical disc;

an object lens drive unit including a bobbin that holds the first and second object lenses, and serves to drive the bobbin to undergo a drive displacement in a focusing direction perpendicular to the recording surface of the optical disc, a tracking direction which is one substantially radial direction of the optical disc, and either one of a radial tilt direction in which movement is performed in a circular direction on an axis in the one substantially radial direction and a tangential tilt direction in which movement is performed in a circular direction on an axis of a tangential direction which is a direction perpendicular to the one substantially radial direction;

a comatic aberration correcting device for correcting a comatic aberration of the second optical system relatively taking place with respect to the first optical system in one of the radial tilt direction and the tangential tilt direction, which is not controlled by the object lens drive unit, and the comatic aberration correcting device is arranged in an optical path of the second optical system between the second collimator lens and the second object lens and out of an optical path of the first optical system;

a photo-detector for receiving light beams reflected from the optical disc; and a control circuit connected to the photo-detector for controlling the comatic aberration connecting device in response to the detected reflected light beams, wherein, each of the first and second object lenses includes a converging portion that converges light and a flange that connects to the bobbin surrounding the converging portion, and a portion of the flange of one of the first and second object lenses is removed and the other one of the first and second object lenses is arranged to overlap the portion of the flange that is removed, so that a distance between the converging portion of the first object lens and the converging portion of the second object lens is equal to a width of the flange of the one of the first and second object lenses that is removed.

* * * * *